United States Patent
Jammer (10) Patent No.: US 9,253,024 B2
(45) Date of Patent: Feb. 2, 2016

(54) CLOSED LOOP COMMUNICATION SYSTEM, APPARATUS AND METHOD

(71) Applicant: Nation-e Ltd, Herzliyya (IL)

(72) Inventor: Daniel Jammer, Herzliyya (IL)

(73) Assignee: NATION-E LTD, Herzeliya (IL)

( * ) Notice: Subject to any disclaimer, the term of this patent is extended or adjusted under 35 U.S.C. 154(b) by 466 days.

(21) Appl. No.: 13/861,376

(22) Filed: Apr. 12, 2013

(65) Prior Publication Data

US 2014/0133291 A1     May 15, 2014

Related U.S. Application Data

(60) Provisional application No. 61/623,085, filed on Apr. 12, 2012.

(51) Int. Cl.
| | |
|---|---|
| *H04L 12/14* | (2006.01) |
| *H04L 12/24* | (2006.01) |
| *H04W 52/02* | (2009.01) |
| *H04W 24/00* | (2009.01) |

(52) U.S. Cl.
CPC ........... *H04L 41/0654* (2013.01); *H04W 24/00* (2013.01); *H04W 52/0219* (2013.01)

(58) Field of Classification Search
CPC ......... H04L 12/437; H04L 12/42; H04J 3/085
See application file for complete search history.

(56) References Cited

U.S. PATENT DOCUMENTS

| | | | |
|---|---|---|---|
| 4,617,506 A | 10/1986 | Bogie et al. | |
| 5,534,734 A | 7/1996 | Pugh et al. | |
| 5,548,200 A | 8/1996 | Nor et al. | |
| 5,550,805 A * | 8/1996 | Takatori | H04J 3/085 370/222 |
| 5,963,013 A | 10/1999 | Watson | |
| 6,339,736 B1 | 1/2002 | Moskowitz et al. | |
| 6,826,460 B2 | 11/2004 | Schneck | |
| 7,602,143 B2 | 10/2009 | Capizzo | |
| 7,619,319 B1 | 11/2009 | Hunter | |
| 2006/0246910 A1 * | 11/2006 | Petermann | H04W 16/26 455/444 |
| 2008/0052387 A1 * | 2/2008 | Heinz | H04L 41/5025 709/223 |
| 2009/0082957 A1 | 3/2009 | Agassi et al. | |
| 2009/0168647 A1 * | 7/2009 | Holness | H04L 12/437 370/228 |
| 2009/0312903 A1 | 12/2009 | Hafner et al. | |
| 2010/0049737 A1 | 2/2010 | Ambrosio et al. | |
| 2010/0065344 A1 | 3/2010 | Collings | |
| 2010/0071979 A1 | 3/2010 | Agassi et al. | |
| 2011/0025267 A1 | 2/2011 | Kamen et al. | |
| 2011/0137485 A1 | 6/2011 | Leitert et al. | |
| 2011/0251935 A1 | 10/2011 | German et al. | |
| 2012/0005031 A1 * | 1/2012 | Jammer | B60L 11/1816 705/16 |
| 2012/0130659 A1 | 5/2012 | Chaves | |
| 2012/0271758 A1 | 10/2012 | Jammer | |

(Continued)

FOREIGN PATENT DOCUMENTS

| | | |
|---|---|---|
| CN | 201371765 | 12/2009 |
| FR | 2872470 | 1/2006 |

(Continued)

*Primary Examiner* — Raj Jain
*Assistant Examiner* — Zhiren Qin
(74) *Attorney, Agent, or Firm* — Graeser Associates International Inc; Dvorah Graeser (57) ABSTRACT

A system, apparatus and method for a closed loop system, which can be operated over a plurality of hardware platforms. Optionally, according to at least some embodiments of the present invention, the system, method and apparatus may be used for control of an energy system.

11 Claims, 7 Drawing Sheets

(56) References Cited

U.S. PATENT DOCUMENTS

2012/0316689 A1* 12/2012 Boardman .......... H02J 13/0079
    700/292
2013/0221918 A1 8/2013 Hill et al.

FOREIGN PATENT DOCUMENTS

| | | |
|---|---|---|
| GB | 2460500 A | 12/2009 |
| JP | 2009213337 | 9/2009 |
| JP | 2010035333 | 2/2010 |
| WO | WO2008006116 | 1/2006 |
| WO | WO2007121322 | 10/2007 |
| WO | WO2008092268 | 8/2008 |
| WO | WO2010019962 | 2/2010 |
| WO | WO2010031687 | 3/2010 |

* cited by examiner

CLOSED LOOP COMMUNICATION SYSTEM, APPARATUS AND METHOD

This Application claims priority from U.S. Provisional Application No. 61/623,085, filed on Apr. 12, 2012, which is hereby incorporated by reference as if fully set forth herein.

FIELD OF THE INVENTION

The present invention relates generally to a closed loop communication system, method and apparatus, and more specifically to such a closed loop communication system that provides secure control of an energy system.

BACKGROUND OF THE INVENTION

Communication systems tend to be open loop, available to a wide number of users, and hence are not secure. For example, telephone and computer network systems, particularly the Internet, are vulnerable to hacking and disruptions by hostile entities. Even institutions which take precautions to avoid such disruptions to their computer systems, for example by duplicating their computer systems on a remote "offsite" location, still are vulnerable to further disruption due to their reliance on open loop communication systems.

SUMMARY OF THE INVENTION

The background art does not teach or suggest a secure, closed loop system, method or apparatus. The background art also does not teach or suggest such a system, method or apparatus which can be operated over a plurality of hardware systems, thereby providing a virtual closed loop system. The background art also does not teach or suggest such a system, method or apparatus for control of an energy system.

According to at least some embodiments of the present invention, there is provided a system, apparatus and method for a virtual closed loop system, which can be operated over a plurality of hardware platforms. Optionally, according to at least some embodiments of the present invention, the system, method and apparatus may be used for control of an energy system.

For example and without limitation, specific entities may optionally be allowed to communicate through the virtual closed loop communication system. Such specific entities optionally include but are not limited to utilities, banks, essential government organizations, large corporations and the like. The virtual closed loop communication system may optionally be used to determine if the regular open loop communication system is under attack or is otherwise compromised.

According to at least some embodiments, communication is provided between batteries as nodes in the virtual closed loop. These batteries may optionally communicate through a plurality of hardware platforms, whether sequentially or simultaneously (the latter may optionally be used to determine the operational status of a variety of hardware platforms). Non-limiting examples of such hardware platforms include one or more of power grid communication, wireless communication (which may optionally comprise one or more of cellular telephone communication or radio communication), wired (landline) telephone communication, computer network communication or satellite communication.

Without wishing to be limited in any way, although the following discussion centers around the delivery of power in the form of electricity, in fact the present invention may also optionally be applied to any grid-delivered commodity, including without limitation water, natural gas, liquid natural gas (LNG), and petroleum based products (including without limitation gasoline, diesel and oil). By "grid-delivered" it is meant any delivery system to a network of geographical locations, but not necessarily limited to a grid comprising pipes; the grid may optionally comprise vehicular delivery for example, additionally or alternatively.

BRIEF DESCRIPTION OF THE DRAWINGS

The invention will now be described in connection with certain preferred embodiments with reference to the following illustrative figures so that it may be more fully understood. With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

In all the figures similar reference numerals identify similar parts.

DETAILED DESCRIPTION OF PREFERRED EMBODIMENTS

Figure 1A:
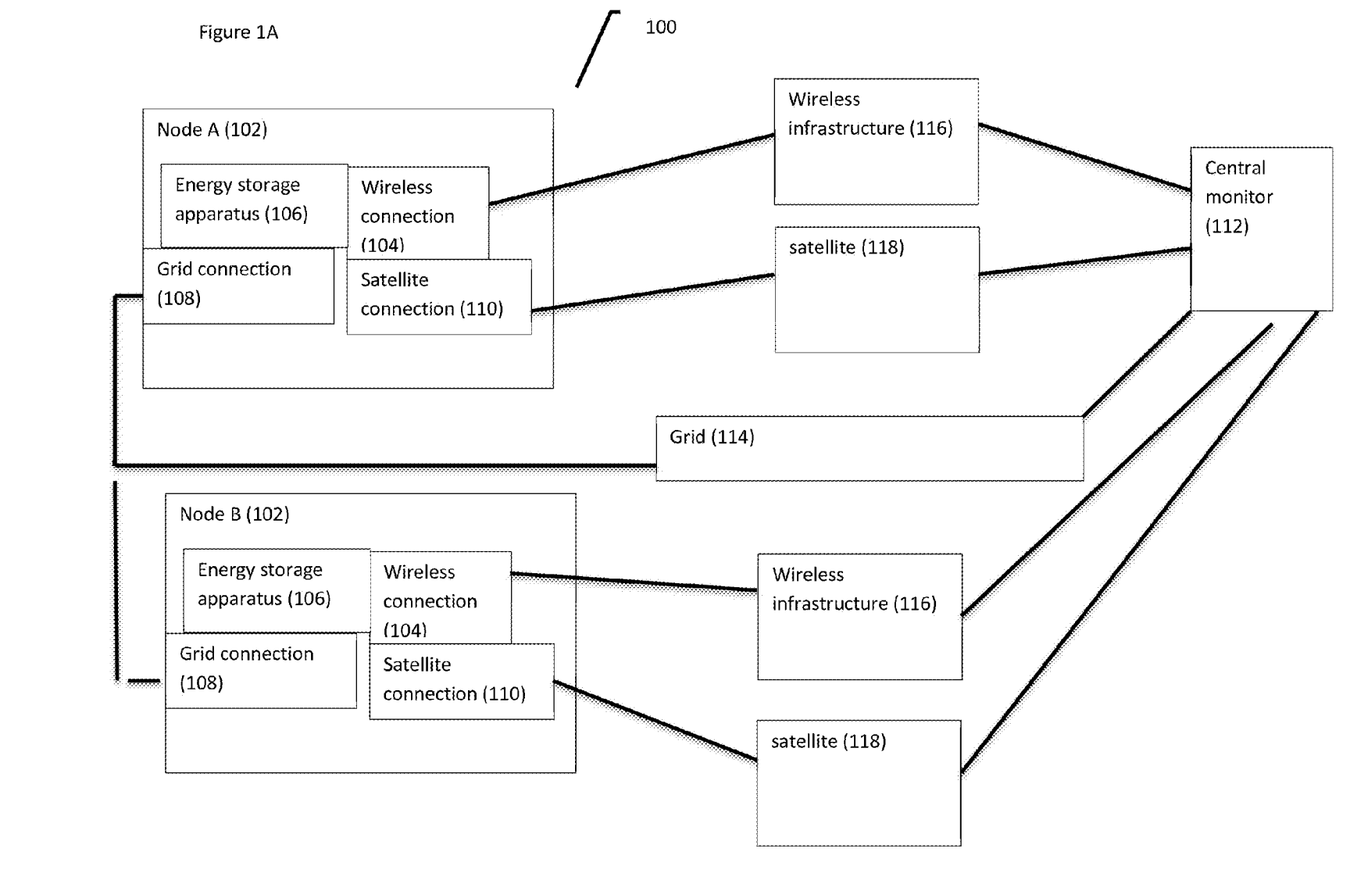
FIGS. 1A and 1B relate to schematic block diagrams showing a system for a virtual closed communication loop, in accordance with an embodiment of the present invention.
Figure 1B:
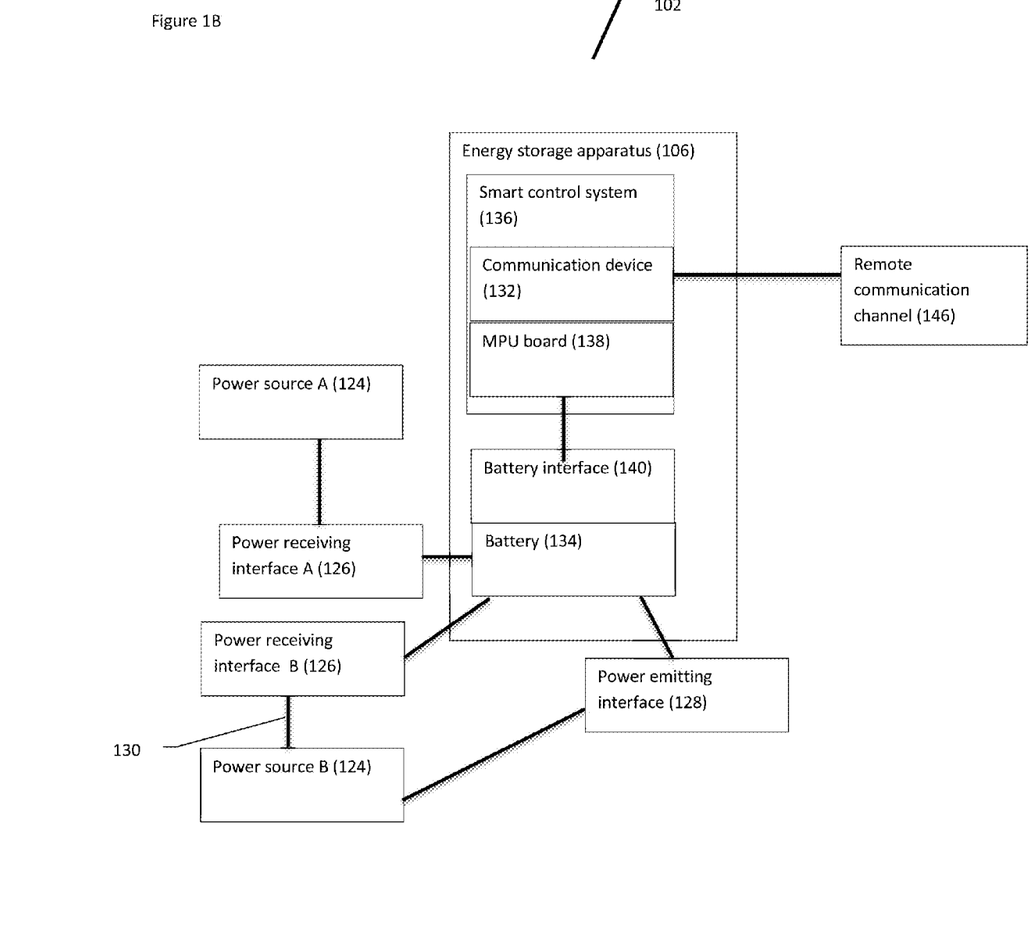
Figure 2:
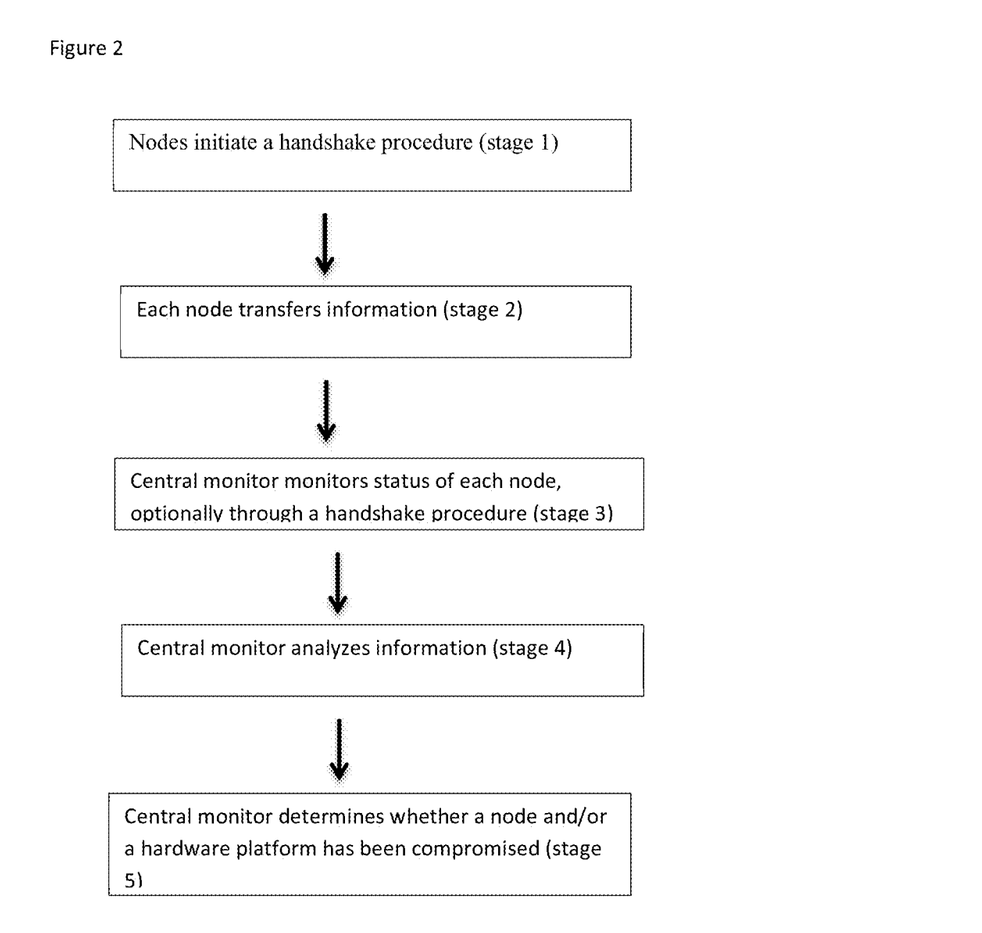
FIG. 2 relates to an exemplary method for operating a closed loop communication system according to the system of FIG. 1 for example.

According to at least some embodiments of the present invention, there is provided a closed loop communication system and method. FIGS. 1 and 2 generally relate to such a system and method.

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

The present invention will be more fully understood from the following detailed description of the preferred embodiments thereof, taken together with the drawings.

Reference is now made to FIGS. 1A and 1B, which relate to schematic block diagrams showing a system for providing a closed loop communication system being operated over a plurality of hardware platforms, in accordance with an embodiment of the present invention. FIG. 1A shows the overall system, while FIG. 1B shows an aspect of the system in more detail.

As shown in FIG. 1A, a system 100 features a plurality of nodes 102, shown as nodes 102 A and B for the purpose of illustration only and without any intention of being limiting. Each node 102 is in communication with a central monitor 112. System 100 may optionally feature a plurality of such central monitors (not shown). Each central monitor 112 is in communication with a plurality of nodes 102 through a plurality of different hardware platforms as shown. Central monitor 112 preferably at least monitors the status of each node 102, as well as the status of each hardware platform through which nodes 102 communicate with central monitor 112. Central monitor 112, together with nodes 102, form the closed loop communication system, which is overlaid over a plurality of different hardware platforms as described in greater detail below.

Optionally all communications pass through central monitor 112; however, preferably the closed loop communication system conducts all communication through nodes 102, such that central monitor 112 only acts to determine the status and activity of system 100, as well as to detect any faults in system 100, such as for example the failure of one or more nodes 102 and/or of one or more hardware platforms. Preferably, each node 102 and also each central monitor 112 is addressable within system 100. Being "addressable" means that each component in system 100 is able to send communications to an appropriate other component(s).

Nodes 102 communicate with each other, and preferably also with central monitor 112, through a plurality of hardware platforms which may optionally comprise one or more of power grid communication, wireless communication (which may optionally comprise one or more of cellular telephone communication or radio communication), wired (landline) telephone communication, computer network communication or satellite communication.

As shown, each node 102 optionally features a wireless connection 104 which communicates with a wireless infrastructure, and a satellite connection 130, which communicates with a satellite 118. Each node 102 is optionally and preferably connected to an electrical grid 114 through a grid connection 108, more preferably both for power and for communication capabilities. As described in greater detail below with regard to FIG. 1B, each node 102 also preferably has a separate power source, shown as an energy storage apparatus 106. Therefore, if grid 114 fails or otherwise cannot supply power, energy storage apparatus 106 is able to supply power to node 102.

FIG. 1B relates to node 102 in more detail, which is preferably connected to a plurality of power sources 124 as shown. Each power source 124 is operatively connected to energy storage apparatus 106 through a power connection 130 and corresponding power receiving interface 126, of which a plurality of each (referenced in each case as A and B) are shown for the purpose of illustration only and without any intention of being limiting. Each power receiving interface 126 may optionally comprise any necessary conversion devices or any other required circuitry (not shown).

Figure 3:
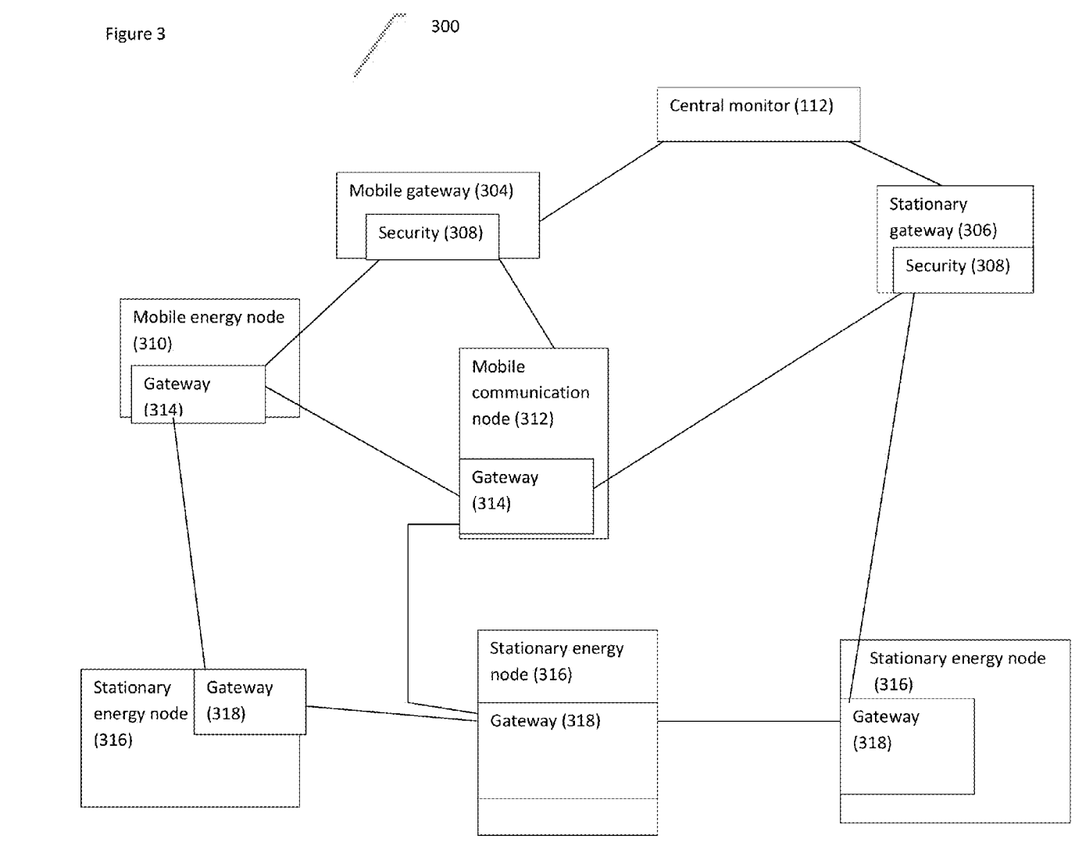
FIG. 3 shows an exemplary, non-limiting illustrative schematic block diagram of a system according to at least some embodiments of the present invention.
Figure 4:
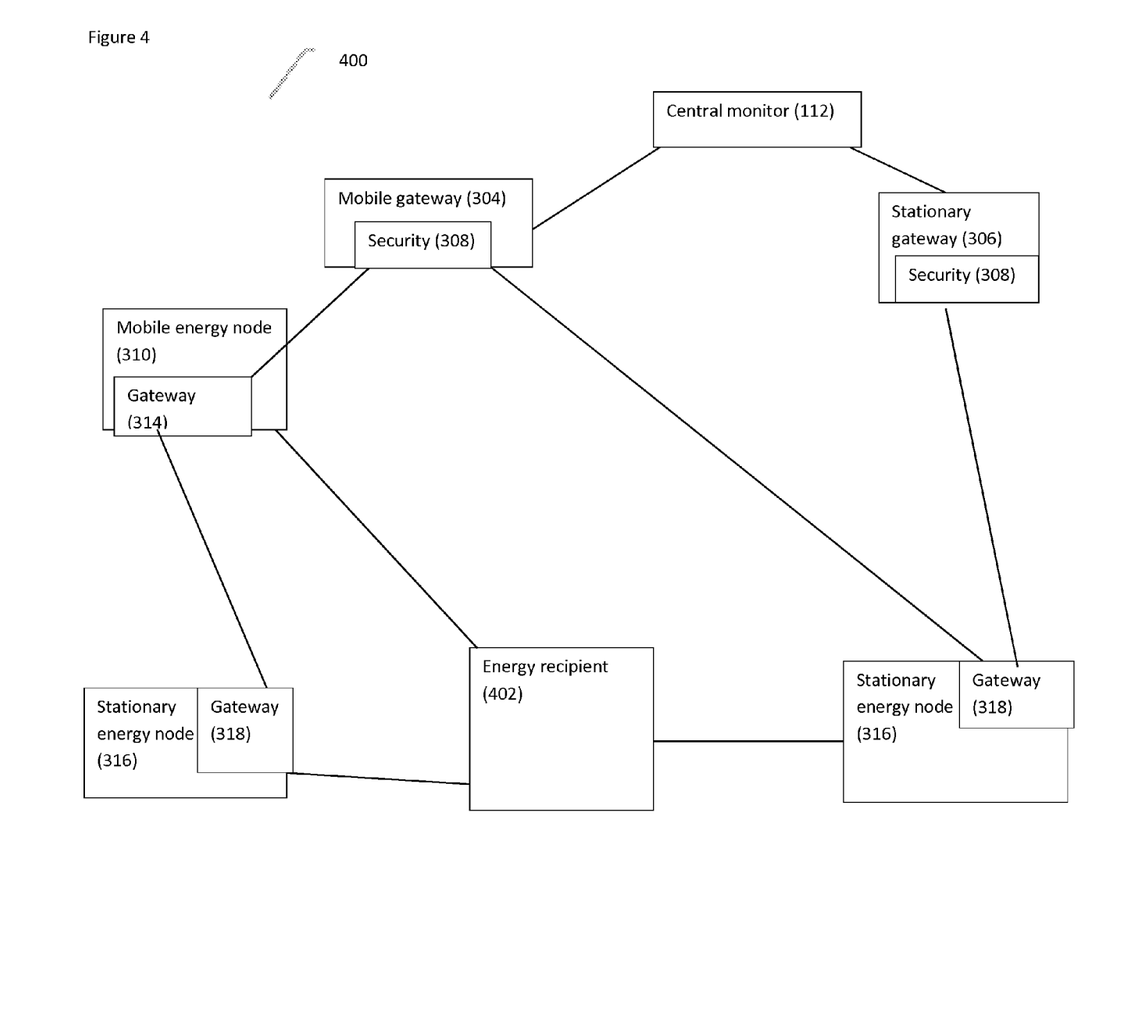
FIG. 4 shows a simplified version of the system of FIG. 3 as a non-limiting illustrative embodiment, but with an additional component—an energy recipient.

Each power receiving interface 126 is in turn operatively connected to a battery 134, which may optionally comprise a plurality of energy cells (not shown, see FIGS. 3 and 4). Battery 134 may optionally comprise any suitable type of battery for example and without limitation, a battery from Kokam Battery (Kokam Company, Korea). If node 102 is operative as a communication center, battery 134 preferably comprises a suitable amount of energy to support the electrical requirements of such a communication center, such as for example and without limitation 100 kW; of course, optionally a plurality of batteries would supply such power (not shown). Battery 134 is optionally and preferably controlled by a smart control system 136, which comprises at least a MPU (master power unit) board 138. MPU board 138 optionally comprises a plurality of control components, more preferably including a processor for executing one or more commands. MPU board 138 is preferably able to command battery 134, for example through a battery interface 140.

MPU board 138 is optionally and preferably able to detect available power and the status of battery 134, as described in greater detail below. MPU board 138 is also optionally and preferably able to detect available power from power source B 124.

Smart control system 136 may also optionally comprise a communication device 132, which may optionally comprise the previously described communication devices for wireless and satellite; if grid communication is supported, optionally communication device 132 also handles such communication but alternatively grid communication is handled by a separate device (not shown). Communication device 132 may optionally include, for example, a wired or wireless Network Interface Card (NIC), a wired or wireless modem, a wired or wireless receiver and/or transmitter, a wired or wireless transmitter-receiver and/or transceiver, a Radio Frequency (RF) communication unit or transceiver, or other units able to transmit and/or receive signals, blocks, frames, transmission streams, packets, messages and/or data. Optionally, communication device 132 includes, or is associated with, one or more antennas, for example, a dipole antenna, a monopole antenna, an omni-directional antenna, an end fed antenna, a circularly polarized antenna, a micro-strip antenna, a diversity antenna, or the like. Communication device 132 is optionally in communication with a remote communication channel 146.

Remote communication channel 146 may optionally comprise a public network, such as the internet, and may include any type of wired or wireless communication network capable of coupling together computing nodes. This includes, but is not limited to, a local area network, a wide area network, or a combination of networks. In some embodiments, remote communication channel 146 comprises a wireless data network including: a cellular network, a WiMAX network, an EV-DO network, an RTT network, a Flash-OFDM network, an iBurst network, a HSPA network, an EDGE network, a GPRS network, a GPS satellite network, a Wi-Fi network, a UTMS network, and/or any combination of the aforesaid networks, which may optionally be private or public networks.

For example and without limitation, power source A 124 may optionally comprise a renewable non-fuel source of power, including but not limited to a wind turbine, a solar power installation, a hydropower installation, a geothermal installation and the like.

For example and without limitation, power source B 124 may optionally comprise grid power, power from a fuel based generator (whether diesel, "biofuel" or the like) and the like. By "grid" it is meant the electrical power grid which connects power generation plants at utilities to entities that receive power.

In some embodiments, some or all of the components of energy storage apparatus 106 may be enclosed in a common housing or packaging, and may be interconnected or coupled or operably associated using one or more wired or wireless links. In other embodiments, components of system 100 may be distributed among multiple or separate devices or locations, may be implemented using a client/server configuration, may communicate using remote access methods, or the like.

MPU board 138 is optionally and preferably able to detect available power from power source B 124. In case of an unplanned outage, reduction in electricity or reduction in the quality of supplied electricity (for example and without limitation, "spikes" or "troughs" in energy level, particularly with regard to higher than desired or permitted variability), MPU board 138 is optionally and preferably able to switch power provision for node 102 from power source B 124 to energy storage apparatus 106. MPU board 138 is optionally able to control power emitting interface 128, to determine how power is supplied to node 102. MPU board 138 is also optionally and preferably able to detect available power and the status of battery 134, for example to determine whether power is received from power source A 124 (optionally to supply power to battery 134).

For example and without limitation, if there is an unexpected cut in power availability or quality to node 102, then MPU board 138 is preferably able to detect this status and to quickly shift power supply from power source B 124 to energy storage apparatus 106. MPU board 138 is preferably able to do so independently of any external entity. Such a quick independent shift means that the communication center (node 102) is able to maintain a smooth uninterrupted power supply, preferably without undesired spikes or other potentially problematic electricity delivery problems. These functions may also optionally be provided, additionally or alternatively, through smart control system 136.

FIG. 2 relates to an exemplary method for operating a closed loop communication system according to the system of FIG. 1 for example.

As shown, in stage 1, a plurality of nodes initiate a handshake procedure to begin communication. Optionally, each node may optionally initiate the procedure. The handshake procedure preferably involves identification of each node. More preferably, each energy storage apparatus of each node has a local address in a network of such apparatuses, thereby enabling the remote control center to identify the apparatus. Most preferably, each energy storage apparatus also features a further identifier for exchanging with the remote control center as part of a security protocol, to reduce any potential problems with "hacking" or other security breaches.

In stage 2, after the handshake process is complete, the nodes preferably exchange information. Such information may optionally be transferred in the form of packets, with a header identifying the energy storage apparatus and optionally the type of information being transferred. Other data transfer formats may optionally alternatively be implemented. The information being transferred preferably includes information to be communicated, but may also optionally comprise status information regarding the battery, local power situation, any historical information, any emergencies or power anomalies, any hardware platform failures or reduced functionality, and so forth.

In stage 3, the central monitor optionally performs a handshake procedure with each node, in order to at least receive status information regarding the battery, local power situation, any historical information, any emergencies or power anomalies, any hardware platform failures or reduced functionality, and so forth.

In stage 4, the central monitor preferably analyzes the information from the node. Optionally, the central monitor is able to determine whether the node has been compromised and/or whether a hardware platform has been compromised, at least in a particular geographic area.

In stage 5, the central monitor preferably analyzes and compares information from a plurality of nodes. If the central monitor detects a geographically constrained anomaly or emergency, the remote control center preferably informs the necessary authorities (for example that there appears to be a power outage and/or communication hardware platform outage in a particular geographical area). Alternatively or additionally, the central monitor may optionally determine that one or more nodes have been compromised, and if so, can notify one or more other nodes to cease all communications with the compromised node(s). Central monitor is also optionally able to reroute communication around the compromised node(s), by changing the addressing system and then transmitting this changed addressing information to one or more other nodes.

FIG. 3 shows an exemplary, non-limiting illustrative schematic block diagram of a system according to at least some embodiments of the present invention. A system 300 features central monitor 112 of FIG. 1A, but also features additional gateways for supporting communication between the nodes, which may optionally be stand-alone combinations of hardware and software (as for a mobile gateway 304 or a stationary gateway 306) and/or may optionally be associated with energy and/or communication nodes as described in greater detail below. The energy nodes of FIG. 3 may optionally be mobile (as in a mobile energy node 310) or stationary (as in a stationary energy node 316); however in any case such energy nodes may optionally comprise similar components as for FIG. 1A, even if not shown.

Turning to FIG. 3, central monitor 112 is in communication with a mobile gateway 304 and a stationary gateway 306, each of which features a security module 308. Security module 308 may optionally feature hardware and/or software, and holds security and encryption keys. Each of mobile gateway 304 and stationary gateway 306 holds routing information, including an address book, and preferably also features a dynamic priority map for energy delivery. Together with central monitor 112, mobile gateway 304 and stationary gateway 306 manage both communication and energy balancing between the energy nodes. Routing information and the address book describe which nodes (whether mobile or stationary) may be accessed and which must be routed around. Furthermore, such information describes the locations of all nodes, whether mobile or stationary. If the location of a mobile node needs to be changed, then mobile gateway 304 and/or stationary gateway 306 may optionally instruct that mobile node to change position.

The dynamic priority map for energy delivery is described in greater detail below. Briefly, the dynamic priority map describes which energy providing nodes, whether mobile or stationary, are able to provide energy within a certain timeframe to a particular geographical location. Non-limiting examples of such timeframes are under 1 second, between 1-10 seconds, between 10-30 seconds, between 30-60 seconds, and between 1 minute to 5 minutes. The dynamic priority map therefore assists with energy load balancing between the various nodes, and also assists in determining the location of mobile energy nodes.

Optionally, one or both of mobile gateway 304 and stationary gateway 306 is not present; alternatively, multiples of one or both of mobile gateway 304 and stationary gateway 306 are present. However in any case such gateways operate under the control and monitoring of central monitor 112 as described in greater detail below.

Optionally and preferably, system 300 features various mobile nodes, shown in this non-limiting example as one or more mobile energy nodes 310 and one or more mobile communication nodes 312, each of which features a gateway 314. Gateway 314 permits communication between the various mobile nodes, as well as communication with mobile gateway 304 and stationary gateway 306 (if not present, communication is performed directly with central monitor 112; not shown). Gateway 314 may optionally feature hardware and/or software, and holds security and encryption keys; furthermore, gateway 314 also holds routing information, including an address book. Gateway 314 also permits status information to be transmitted back to central monitor 112, whether directly (not shown) or through mobile gateway 304 and/or stationary gateway 306.

Each mobile energy node 310 holds energy in addition to communication equipment, including but not limited to various types of wireless communication equipment as described herein and as shown in FIG. 1A. Each mobile energy node 310 is optionally and preferably in communication with mobile gateway 304 and/or with mobile communication node 312 as shown.

Mobile communication node 312 optionally holds the same or similar communication equipment as mobile energy node 310 but does not hold energy. In addition to mobile energy node 310, mobile communication node 312 is optionally and preferably in communication with mobile gateway 304 and/or stationary gateway 306, again through gateway 314.

System 300 also preferably features stationary energy nodes 316, each of which features a gateway 318. Gateway 318 may optionally function in a similar manner as gateway 314. For example, gateway 318 may optionally feature hardware and/or software, and holds security and encryption keys; furthermore, gateway 318 also holds routing information, including an address book. Gateway 318 also permits status information to be transmitted back to central monitor 112, whether directly (not shown) or through mobile gateway 304 and/or stationary gateway 306 and/or mobile energy node 310 and/or mobile communication node 312. Gateway 318 may also optionally comprise communication hardware as described with regard to FIG. 1.

Although the hierarchy shown herein in FIG. 3 indicates that stationary energy nodes 316 communicate through mobile energy nodes 310 and/or mobile communication nodes 312 and/not vice versa, optionally the reverse is true (not shown).

The connections between the various components, shown as solid lines, depend upon the nature of the components being connected and hence are divided into two types. Any connection to or from a mobile unit of some type (mobile gateway 304, mobile energy node 310 or mobile communication node 312) is wireless, for example as described with regard to FIG. 1A. Connections between stationary units, such as between stationary energy node 316 and stationary gateway 306, may optionally be wired or wireless, and may even optionally be performed through the grid, for example as described with regard to FIG. 1A.

FIG. 4 shows a simplified version of the system of FIG. 3 as a non-limiting illustrative embodiment, but with an additional component—an energy recipient. As shown a system 400 may optionally feature all of the components of FIG. 3 or a subset thereof, of which a subset is shown for simplification, and also an energy recipient 402. Energy recipient 402 is able to receive energy from stationary energy node 316, to which energy recipient 402 is connected through a wired power connection, which may optionally comprise the grid. Energy recipient 402 is also able to receive energy from mobile energy node 310, which is assumed to need to move into a physical position at the geographic location of energy recipient 402 for the power to be delivered. The latency of each of stationary energy node 316 and mobile energy node 310 determines the speed with which each may deliver power to energy recipient 402; as described above, non-limiting examples of such timeframes (or maximum period of time for delivering energy) are under 1 second, between 1-10 seconds, between 10-30 seconds, between 30-60 seconds, and between 1 minute to 5 minutes.

Optionally energy may be collected from a plurality of stationary energy nodes 316 and/or mobile energy nodes 310, or a combination thereof, and then transmitted to energy recipient 402—optionally even from a single source. For example and without limitation, energy may optionally be collected by a specific stationary energy node 316 (optionally even from one or more mobile energy nodes 310 that are not connected directly to it) and then provided to energy recipient 402. The above described routing, address book and dynamic mapping protocols optionally support these various possibilities for energy delivery and load balancing.

Figure 5:
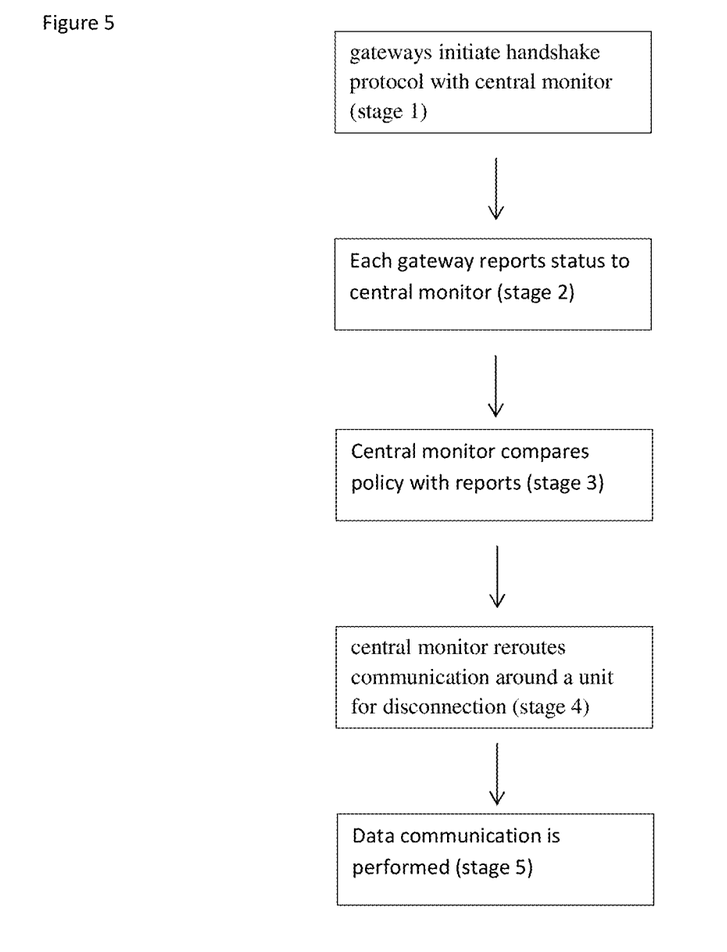
FIG. 5 shows an exemplary, illustrative method according to at least some embodiments of the present invention for determining routing.

FIG. 5 shows an exemplary, illustrative method according to at least some embodiments of the present invention for determining routing. As shown, in stage 1, all gateways initiate a handshake protocol with the central monitor, directly or indirectly; optionally, the gateways may also initiate a handshake protocol with each other (for example, for communication between a stationary or mobile energy node and a stationary or mobile gateway).

In stage 2, every gateway preferably reports its status, directly or indirectly, to the central monitor. Status preferably includes but is not limited to operational status and energy status (in terms of energy levels) where applicable, and also geographic location. Preferably, geographic location is reported by both stationary and mobile units.

In stage 3, the central monitor compares the policy, regarding the locations of the different units and their status, with the actual reports, and determines whether the various units are within policy defined limits. If a unit is not within a policy defined limit (for example, it fails to report back within a certain period of time), then the central monitor can determine whether to disconnect that unit from the network.

If disconnection is required, then in stage 4, the central monitor reroutes communication around the unit, and distributes new routing information and address books to the different gateways (for FIGS. 5 and 6, the word "gateway" is assumed to encompass mobile gateway 304, stationary gateway 306, and gateways 314 and 318, unless otherwise stated), preferably with the exception of the node that has been disconnected (that is not within policy limits).

In stage 5, data communication is performed between the various units according to the routing information and address books. Energy transmission is described with regard to FIG. 6 below.

Figure 6:
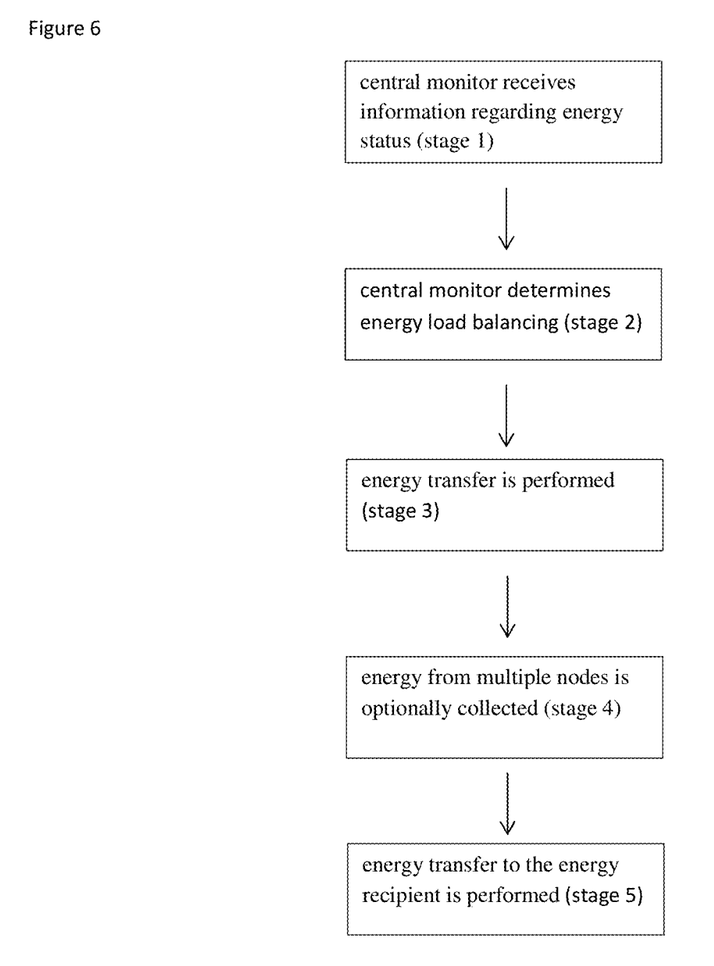
FIG. 6 shows an exemplary, illustrative method according to at least some embodiments of the present invention for energy load balancing.

FIG. 6 shows an exemplary, illustrative method according to at least some embodiments of the present invention for energy load balancing. The method of FIG. 5 is not necessarily performed in combination with the method of FIG. 6, nor is the timing of these methods linked. Without wishing to be limited in any way, it is anticipated that the method of FIG. 6 may optionally be performed more frequently than that of FIG. 5, given the cost to the system of the method of FIG. 5.

In stage 1, the central monitor receives information regarding the energy status of the various units, including without limitation mobile energy nodes and stationary energy nodes. It is anticipated that location data is also provided, at least for mobile energy nodes (such location data may optionally be transmitted continuously or at least highly frequently—say every tens of seconds, every minute or every tens of minutes—for example through GPS or other art known location methods).

In stage 2, the central monitor determines energy load balancing across the system; optionally, local stationary and/or mobile gateways may also perform local energy load balancing. Energy load balancing preferably includes determining which energy nodes (mobile or stationary) receive energy, whether to other nodes or to an energy recipient, and which energy nodes transmit energy. Such a determination is optionally and preferably performed according to the required time response period (which as described above may optionally and preferably range from less than 1 second to up to 10 minutes), policy and other considerations. The location of each energy node is also considered.

This stage may also optionally comprise instructing a mobile energy node to move to a new location. This stage also optionally and preferably comprises determining the dynamic priority map, according to the previously described policy, the locations of the various nodes and also the status of the various nodes. The dynamic priority map preferably also comprises mapping of the various locations of the nodes to the various geographic locations of the energy recipients, or at least an analysis of their relative locations.

In stage 3, energy transfer is performed, whether to another energy node and/or to an energy recipient, as previously described. Also as previously described, energy transfer may optionally occur through a wire or through movement of a mobile energy node. Wired power transmission may optionally be performed through the electrical grid.

In stage 4, energy from multiple nodes is optionally collected at a specific node or combination of nodes before transfer to the energy recipient, as previously described. Such collection and transmission may optionally be performed more than once before transmission to the energy recipient.

In stage 5, energy transfer to the energy recipient is performed, and the energy status of the nodes involved at least is preferably reported to the central monitor for updating.

The references cited herein teach many principles that are applicable to the present invention. Therefore the full contents of these publications are incorporated by reference herein where appropriate for teachings of additional or alternative details, features and/or technical background.

It is to be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

What is claimed is:

1. A system in closed loop communications, comprising:
a) a first set of a plurality of hardware communication channels, each hardware communication channel comprising a hardware platform;
b) a plurality of nodes, each node being addressable and each node comprising an energy storage device and a first set of a plurality of communication interface devices configured to communicate through at least two hardware communication channels which are different from said first set of a plurality of hardware communication channels;
c) a central monitor, comprising a second set of a plurality of communication interface devices configured to communicate through said at least two different hardware communication channels, monitoring communications of said nodes over said first set of hardware communication channels and rerouting communication between said nodes due to failure of at least one node or of a hardware communication channel; wherein said nodes and said central monitor form a closed loop communication system; and
d) a power grid and wherein said central monitor and said nodes control energy distribution through said power grid and through said energy storage devices;
wherein said central monitor and said nodes perform a handshake procedure to initiate communication, followed by reporting by said nodes to said central monitor and then by said central monitor directing said nodes regarding energy balancing.

2. The system of claim 1, wherein said first set of or second set of hardware communication channels are selected from the group consisting of power grid communication, wireless communication, wired (landline) telephone communication, computer network communication and satellite communication, or a combination thereof.

3. The system of claim 2, further comprising a gateway for relaying communications between said central monitor and said nodes.

4. The system of claim 3, wherein said nodes comprise mobile nodes and stationary nodes, and wherein said reporting by said nodes to said central monitor comprises reporting a location of each node to said central monitor.

5. The system of claim 4, wherein said central monitor directs at least one mobile node to move to a particular geographic location for said energy balancing.

6. The system of claim 5, further comprising an energy recipient, wherein said central monitor directs at least one node to provide energy to said energy recipient according to a policy and a dynamic map of locations of said nodes; wherein said policy comprises a maximum period of time to deliver said energy to said energy recipient.

7. The system of claim 6, wherein said maximum period of time comprises at least one of under 1 second, between 1-10 seconds, between 10-30 seconds, between 30-60 seconds, or between 1 minute to 5 minutes.

8. The system of claim 7, wherein said central monitor directs a plurality of nodes to provide energy to a specific node and wherein said specific node then delivers said energy to said energy recipient.

9. The system of claim 6, wherein each node comprises a gateway for supporting communication with at least one other node, a stationary or mobile gateway, or said central monitor.

10. The system of claim 9, wherein said central monitor determines routing for communication between nodes and an address book, and wherein said routing and said address book are sent to said gateways of said nodes.

11. The system of claim 10, wherein said central monitor determines that a specific node is not to be included in said routing according to a status of said specific node, and wherein said central monitor determines updated routing and an updated address book, wherein said updated routing and said updated address book are sent to said gateways of said nodes.

* * * * *